(12) United States Patent
Hechtl

(10) Patent No.: US 7,156,650 B2
(45) Date of Patent: Jan. 2, 2007

(54) DEVICE FOR REMOVING AN INJECTION MOLDED SUBSTRATE FROM AN INJECTION MOLD

(75) Inventor: Wolfgang Hechtl, München (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 10/829,923

(22) Filed: Apr. 22, 2004

(65) Prior Publication Data

US 2004/0224050 A1    Nov. 11, 2004

Related U.S. Application Data

(63) Continuation of application No. PCT/EP02/08741, filed on Aug. 6, 2002.

(30) Foreign Application Priority Data

Oct. 26, 2001    (DE)    ................. 101 52 932

(51) Int. Cl.
*B29C 45/42*        (2006.01)
(52) U.S. Cl. .................. 425/556; 425/315; 425/444; 425/806; 425/810
(58) Field of Classification Search .............. 425/308, 425/315, 444, 553, 554, 556, 806, 810
See application file for complete search history.

(56) References Cited

U.S. PATENT DOCUMENTS 4,738,613 A    4/1988   Eichlseder et al.

FOREIGN PATENT DOCUMENTS

| DE | 24 14 741 | 10/1975 |
|---|---|---|
| DE | 28 38 634 | 5/1979 |
| DE | 35 26 632 | 2/1987 |
| EP | 0 205 152 A2 | 12/1986 |
| EP | 06 79 493 A2 | 11/1995 |
| GB | 11 72 827 | 12/1969 |
| JP | 63 203308 | 8/1988 |
| JP | 04067924 A | 3/1992 |
| JP | 06-198986 | * 7/1994 |
| JP | 06 315957 A | 11/1994 |
| JP | 07 205220 A | 8/1995 |
| JP | 2000 235740 A | 8/2000 |
| JP | 2000 334787 A | 12/2000 |
| WO | WO 94 19 166 A2 | 9/1994 |

OTHER PUBLICATIONS

English abstract for JP 06-198686.*
English abstract and computer translation for JP 2000-334787.*

* cited by examiner

*Primary Examiner*—Donald Heckenberg
(74) *Attorney, Agent, or Firm*—Henry M. Feiereisen

(57) ABSTRACT

A device for removing an injection-molded substrate with attached sprue from an injection mold having half-molds, in particular a substrate for optical data carriers, includes a lever that can swing in and out of a position between the half-molds of the injection mold and is constructed to include a substrate retaining mechanism with a substrate retaining member with a recess or an opening sized to hold the substrate and configured to receive the sprue with a pass fit. The substrate retaining member secures the substrate in place as the lever swings in and out of the open half-molds. An injection molding machine using the device is also described. The substrate can be quickly demolded and the sprue removed in a single operation without producing dust in the mold.

25 Claims, 9 Drawing Sheets

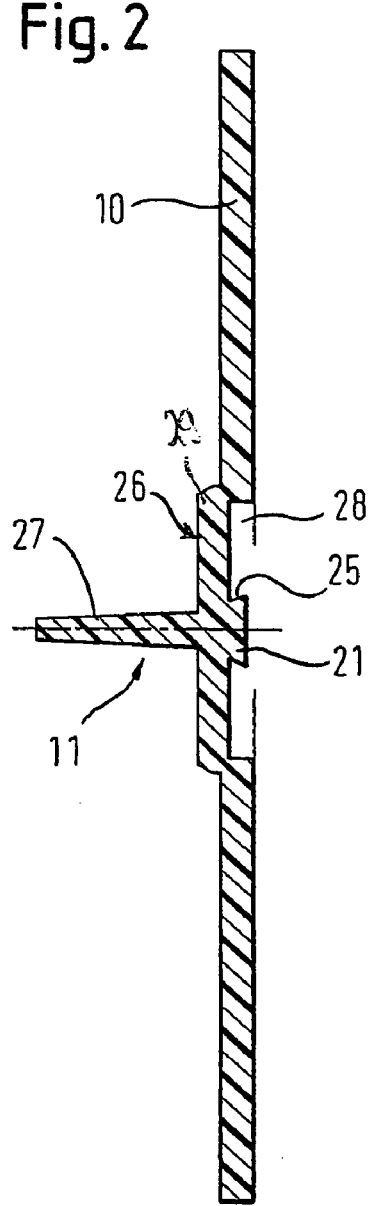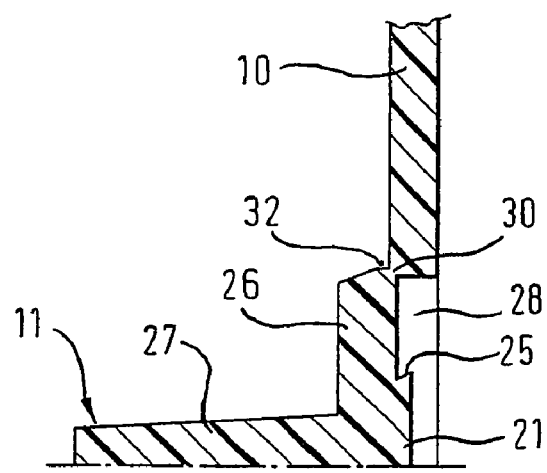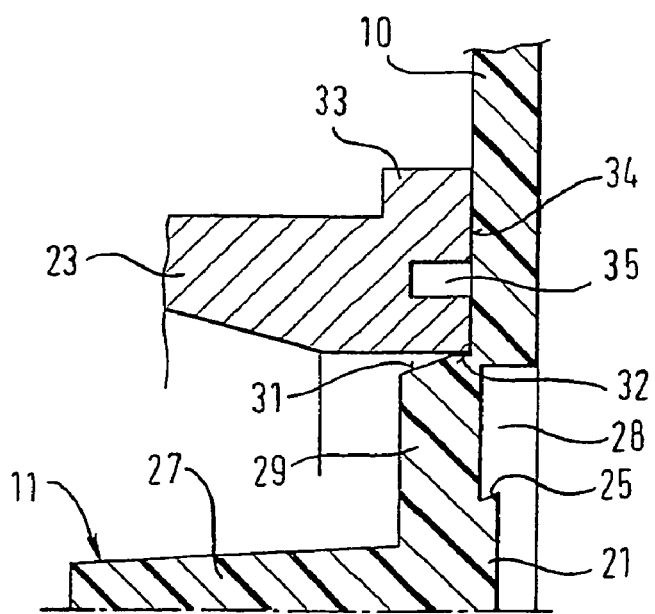

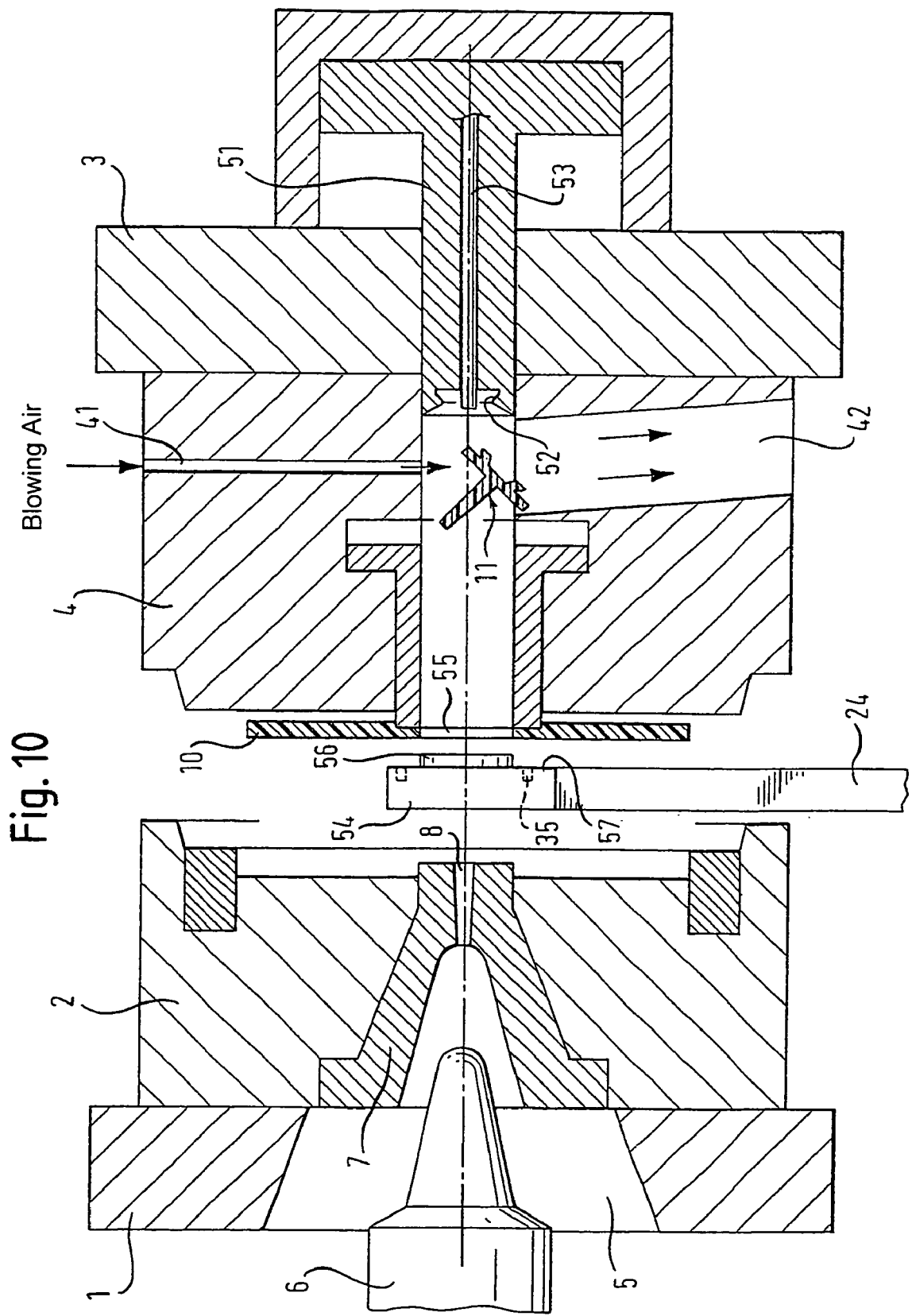

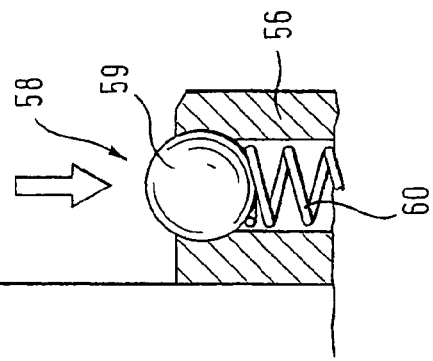
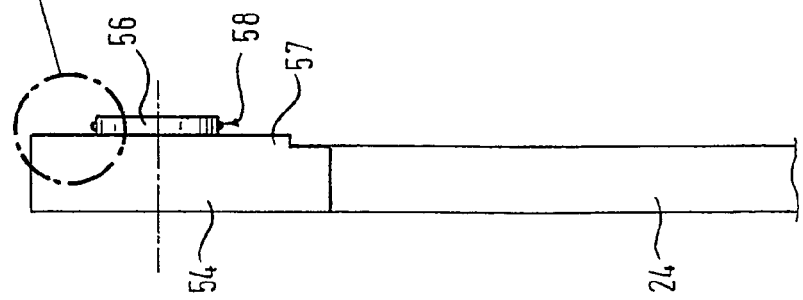
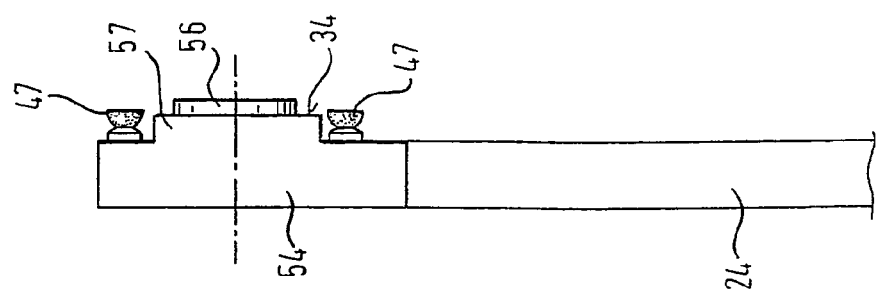
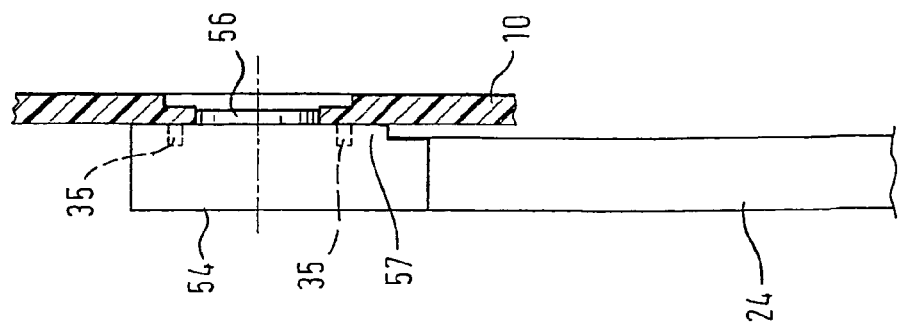

DEVICE FOR REMOVING AN INJECTION MOLDED SUBSTRATE FROM AN INJECTION MOLD

CROSS-REFERENCES TO RELATED APPLICATIONS

This application is a continuation of prior filed copending PCT International application no. PCT/EP02/08741, filed Aug. 6, 2002, which designated the United States and on which priority is claimed under 35 U.S.C. §120, the disclosure of which is hereby incorporated by reference.

This application claims the priority of German Patent Application, Serial No. 101 52 932.5, filed Oct. 26, 2001, pursuant to 35 U.S.C. 119(a)–(d), the disclosure of which is incorporated herein by reference.

BACKGROUND OF THE INVENTION

The present invention relates to an extraction device for removing an injection molded substrate from an injection mold, and to an injection molding machine provided with an extraction device. Such devices and machines are useful in the production of optical data carriers, such as CD, CD-R, DVD, DVD-R, single-CD, OBC, and the like.

European patent publication no. EP 0 205 152 A2 and German patent publication no. DE 2414741 disclose a gripper for removing an injection molded substrate from an injection mold, wherein the gripper has rubber suction cups and can be pivoted in and out in relation to the opened injection mold. The gripper is moved close to the injection molded substrate, so that the suction cups come into contact with the injection molded substrate. A vacuum is produced in the suction cups, causing the substrate to adhere to the suction cups. The gripper then moves away from the half-mold that holds the substrate by an axial distance sufficient to remove the injection molded substrates from the half-mold. The gripper is then pivoted out of the region of the injection mold and rotated so that the substrate can be transferred to the following processing station in a horizontal orientation.

Grippers with suction cups used heretofore, however, are not capable of quickly removing the substrate from the injection mold to the outside, because the attainable pivoting speeds depend on the holding power of the suction cups. The inertial forces produced by a rapid pivoting motion can be so great that the substrates can slip off the suction cups entirely and drop down, or at least shift, so that the substrates can no longer be transferred to the following processing stations with the required positioning accuracy. This limits an achievable improvement in the cycle time, which is important for an economical production of optical data carriers.

Typically, the manufacture of substrates for optical data carriers involves a supply of plastic material, after melting in a plasticizing unit, in the center of the substrates through a sprue channel that extends perpendicular to the substrate plane. The plastic melt is hereby introduced in the region of the later opening in the center of the substrate and uniformly distributed across the periphery of this opening into the mold cavity. The sprue formed during the injection molding process in the sprue channel must be separated from the substrate after the cool-down phase and removed.

German patent publication no. DE 28 38 634 discloses a process for making a ring-shaped article by an injection molding process, whereby the sprue that is connected with the article is punched out inside the injection mold from the injection-molded article and expelled by an sprue ejector.

The manufacture of substrates for optical data carriers of the afore-described type places stringent demands on precision and cleanliness. For this reason, producing the central openings by punching out the sprue in the injection mold carries significant risks.

To address this problem, German patent publication no DE 35 26 632 C2 proposes to form a substantial part of the opening in the substrate in axial dimension already during the injection molding process. The connection zone between the substrate and the sprue can be made small enough for the cross-section to allow plastic melt to pass through. The sprue hereby protrudes in the axial direction slightly beyond the substrate in the connection zone. The axial offset and the diameter of the sprue part protruding beyond the substrate are selected so that during separation of the sprue from the substrate a separation edge is formed that is inclined at an angle of 45° relative to the plane of the opening in the substrate, whereby the injection-molded article amounts to 70% of the axial length of the opening and the part being separated amounts to 30% of the axial length of the opening. After the cool-down phase, the sprue is held by an undercut in a sleeve that can axially move in the mold, with an ejector being axially movable in the sleeve. The sprue is separated along the narrow separation edge from the substrate by retracting the sleeve. The sleeve is then moved farther to the back, until the sprue reaches the region of an opening in the injection mold. By moving the ejector forward, the sprue is pushed out of the sleeve and can drop out of the injection mold through the opening. The substrate is removed by rotating a gripper into the open injection mold. The gripper is provided with rubber suction cups that are applied outside the information-carrying area of the optical data carrier, in particular inside the so-called clamping region. The substrate can also be pushed into an outlet channel after demolding. The outlet channel is less suitable for the removal of substrates for optically readable business cards (so-called OBC=Optical Business Card) due to their rectangular shape.

However, for a number of reasons, this proposal is also endowed with drawbacks and shortcomings because the described separation at a separation edge cannot prevent formation of dust.

It would therefore be desirable and advantageous to provide an improved extraction device for removing an injection molded substrate from an injection mold, in particular substrates for optical data carriers, to obviate prior art shortcomings and to allow a rapid pivoting motion, without risk that the substrate shifts or even detaches during the pivoting motion.

It would also be desirable to provide an improved injection molding machine, in particular for manufacturing a substrate for optical data carriers, to obviate prior art shortcomings and to attain short cycle times while entirely eliminating the risk of dust formation inside the injection mold.

SUMMARY OF THE INVENTION

According to one aspect of the present invention, a device for removing an injection-molded substrate with attached sprue from an injection mold having half-molds, in particular a substrate for optical data carriers, includes a lever that can swing in and out of a position between the half-molds of the injection mold and is constructed to include a substrate retaining mechanism. The substrate retaining mechanism includes a substrate retaining member having a receptacle, such as a recess or an opening, sized to hold the substrate and configured to receive the sprue with a pass fit so that the substrate retaining member secures the substrate in place as the lever swings in and out.

According to another aspect of the invention, an injection molding machine for producing a substrate having a sprue, in particular a substrate for optical data carriers, includes an injection mold having half-molds that form a mold cavity for the substrate and also have a sprue channel for introducing plastic melt into the mold cavity. The injection molding machine further includes an extraction device for removing the substrate with the attached sprue, wherein the extraction device includes a lever that can swing in and out of a position between the half-molds of the injection mold and is constructed to include a substrate retaining mechanism. The substrate retaining mechanism includes a substrate retaining member having a receptacle, such as an opening or a recess, sized to hold the substrate and configured to receive the sprue with a pass fit so that the substrate retaining member secures the substrate in place as the lever swings in and out. The injection molding machine also includes a sprue ejector for separating the sprue from the substrate. The sprue ejector placed outside the injection mold and has an axially movable die, with which the substrate retaining member can be aligned, after the lever swings out of the half-molds. A resistance member is placed on a side of the substrate retaining member facing away from the die, so that the substrate retaining member is urged against the resistance member when the sprue is expelled.

With the sprue removal devices described herein, a high pivoting speed of the lever can be attained without the risk that the substrates slide or fall off during the pivoting motion, regardless if the substrate is held by a peg formed on the substrate retaining member (in the embodiment where the sprue is removed inside the half-molds) or in a recess or an opening of a substrate retaining member (where the sprue is removed in a separate device located outside the half-molds).

In an advantageous embodiment of the invention, the sprue can have a portion protruding from the substrate, with the recess or opening of the substrate retaining member substantially matching the diameter of the protruding portion of the sprue. However, to prevent the sprue from getting jammed in the substrate retaining member, the diameter of the recess or opening in the substrate retaining member should be slightly greater than the diameter of the protruding portion of the sprue, for example, by less than 0.05 mm, preferably by 0.01 mm to 0.03 mm.

In one advantageous embodiment, vacuum channels, optionally connected to a vacuum pump, can be provided in the support surface of the substrate retaining member for defining the position of the substrate in the axial direction (i.e., in the direction of the mold closing motion or parallel to the pivot axis of the lever). The support surface area preferably should not exceed the area of the clamping region.

Alternatively, the substrate can be held against the support surface of the substrate retaining member by suction cups. However, suction cups contact the substrate and can therefore leave imprints on the substrates, which can interfere with the subsequent metallization of the substrate. This may cause a problem, in particular since there is an increasing trend to metallize not only the information-bearing region, but also the clamping region to later print information thereon. In yet another embodiment, the substrate can be held in the axial direction (i.e., in the direction of the mold closing motion or parallel to the pivot axis of the lever), by providing in the peg spring-biased balls.

Dust formation inside the injection mold can be essentially eliminated by separating the sprue from the substrate in a separate unit located outside the injection mold.

Advantageously, the cycle time for removing the substrate from the half-mold can be kept short by having the lever perform only a pivoting motion, without requiring an additional axial motion of the lever parallel to the pivot axis towards the substrate. The half-mold supporting the substrate can include a sleeve movable in the mold closing direction, which can be used to press the substrates together with the sprue into the recess or opening of the substrate retaining member.

The injection molding machine, in particular for producing a substrate for optical data carriers, can advantageously demold the substrate and remove the sprue in a single operation. This reduces the cycle time and eliminates problems associated with dust formation in the mold when the sprue is removed. The precise geometrical fit between the substrate with the attached sprue and the substrate retaining member enables a clean demolding and sprue removal process, while also eliminating stress in the substrate. One or more air nozzles can be used to produce a Venturi effect in the sprue removal unit which suctions off any dust generated during the sprue removal and thus keeps the dust away from the region of the mold.

In one advantageous embodiment of the injection molding machine, the sprue ejector includes a spring-loaded clamp in surrounding relationship to the die, wherein the clamp can be pressed against the substrate during separation of the sprue, before the die contacts the sprue.

According to another advantageous embodiment of the injection molding machine, the resistance member can be constructed as a sprue removal unit and include at least one air nozzle for generating a Venturi effect. The resistance member can be secured to the fixed half-mold or the fixed platen so that the substrate is located between the sprue ejector and the resistance member when the mold is closed.

Advantageously, the sprue ejector of the injection molding machine can be secured to the moving half-mold or the moving platen so that the sprue ejector is located directly in front of the substrate, when the mold is closed, allowing the sprue to be pushed out.

According to yet another advantageous embodiment of the injection molding machine, the extraction device can include a standard handling unit with a gripper arm, and a following handling unit can likewise include a gripper arm that also has identically or similarly constructed substrate retaining means.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a detailed view of a sprue formed on a substrate;

FIG. 3 is a detailed view of the sprue of FIG. 2;

FIG. 4 is a detailed view of a pass-fit between the substrate with the sprue and a substrate retaining member;

FIG. 10 is a schematic sectional view of another embodiment of an extraction device according to the present invention for removing a sprue;

FIG. 11A is a detailed view of the pivot arm of the pivoting mechanism with a retaining mechanism for holding the substrate using vacuum channels;

FIG. 11B is a detailed view of a variation of the retaining mechanism using suction cups;

FIG. 11C is a detailed view of yet another variation of the retaining mechanism using spring-biased balls; and FIG. 11D is a detailed view of the spring-biased balls of FIG. 11C.

DETAILED DESCRIPTION OF PREFERRED EMBODIMENTS

Figure 1:
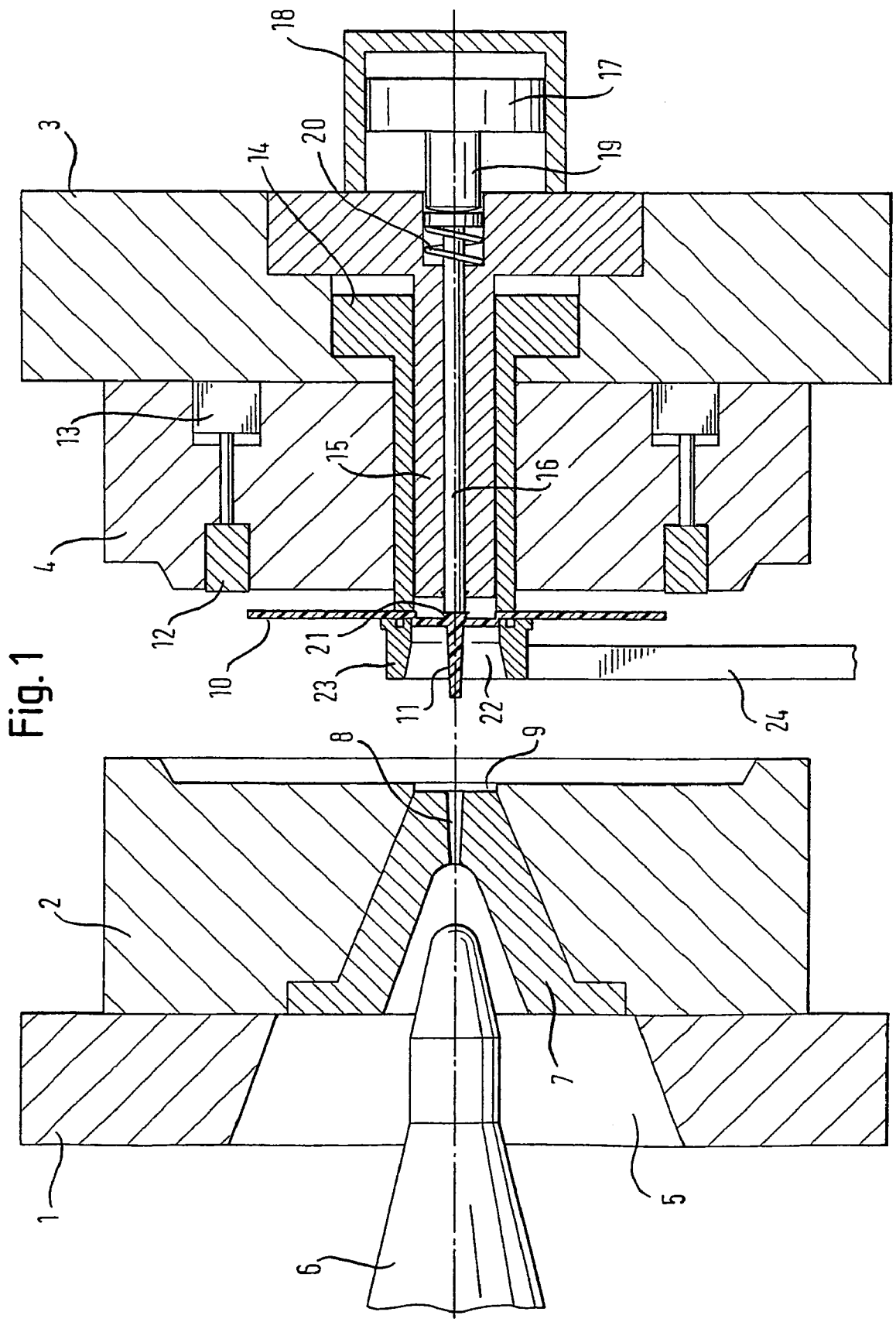
FIG. 1 is a schematic sectional view of one embodiment of an extraction device of an injection molding machine in accordance with the present invention for removing a sprue.
Figure 5:
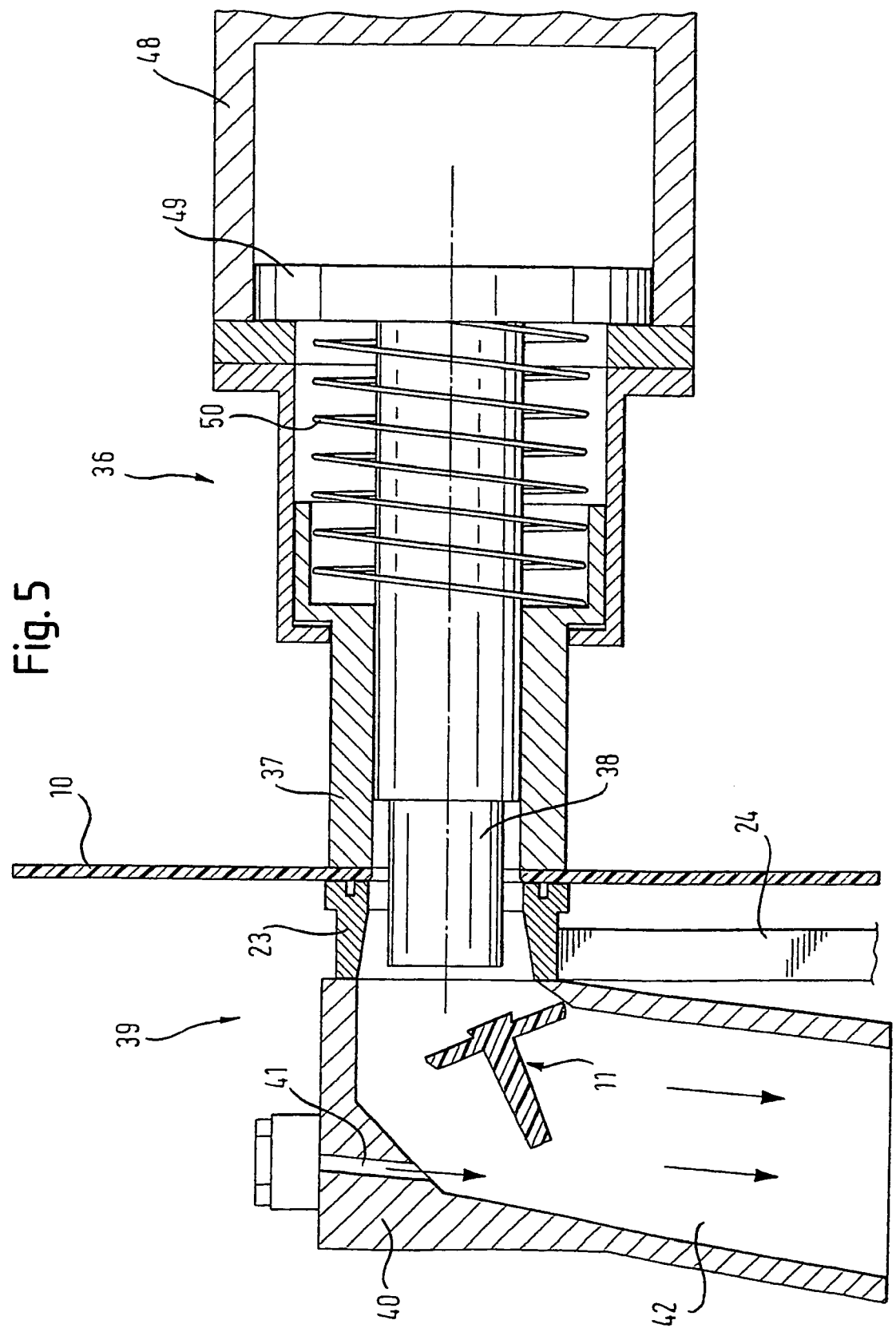
FIG. 5 is a schematic sectional view of a sprue ejector of the injection molding machine for removing the sprue.

Throughout all the Figures, same or corresponding elements are generally indicated by same reference numerals. The exemplary embodiments relate to the manufacture of optical data carriers, such as CD, DVD, OBC and the like. However, these depicted embodiments are to be understood as illustrative of the invention and not as limiting in any way, and the removal device according to the invention can also be employed with other injection molded parts for achieving short cycle times. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in FIG. 1 schematically a clamping unit of an injection molding machine, wherein a fixed half-mold 2 is attached on a fixed platen 1 and a moving half-mold 4 is attached on a moving platen 3. In addition, drive and guide means (not shown) are provided for opening and closing the moving platen 3. The fixed platen 1 has an opening 5, through which an injection nozzle 6 of an injection unit (not shown) can be move towards a sprue bushing 7. The fixed half-mold 2 includes a sprue channel 8 and a recess 9 in which the sprue 11 that remains on the substrate 10 is formed. A mold ring 12 is provided in the moving half-mold 4 and can be moved in and out with hydraulic units 13 in the direction of the moving half-mold 2. The mold ring 12 forms a so-called compression ring which enables the formation of a pre-enlarged mold cavity in an injection compression process, while simultaneously preventing the plastic melt from exiting the pre-enlarged mold cavity. A knock-out sleeve 14 and a ejector needle 16 which extends through the center portion 15 of the moving half-mold 3 are arranged in the moving platen 3 and the moving half-mold 4, which can all be moved by applying pressure. In the exemplary embodiment depicted in FIG. 1, the ejector needle 16 is operated by a piston 17 disposed in a hydraulic cylinder 18 that can be moved by applying pressure, so that the piston rod 19 moves the ejector needle 16 forwards. The ejector needle 16 is retracted to its initial position by a return spring 20 when the pressure is removed. The center portion 15 has an undercut (not visible in FIG. 1), into which a short section 21 of the sprue 11 facing the moving half-mold 4 is formed.

The short section 21 of the sprue 11 is demolded by moving the ejector needle 16 forward. Demolding the substrate 10 from the moving half-mold 4 and the mold ring 12 involves a forward movement of the knock-out sleeve 14. The substrate together with the sprue 11 are pushed into the opening 22 of a substrate retaining member 23 by simultaneously operating the knock-out sleeve 14 and the ejector needle 16. The substrate retaining member 23 is attached to one end of a lever 24, whose other end is secured to a pivoting mechanism (not shown in FIG. 1) located outside the injection mold. This pivoting mechanism swings the lever 24 in and out between the half-molds 2 about an axis 43 (see FIG. 6) extending in parallel relationship to the closing direction.

After the knock-out sleeve 14 and the ejector needle 16 are retracted, the lever 24 can be pivoted out of the half-molds 2, 4 at high speed. The pivoting motion of the lever 24 is coupled to the motion of the moving half-mold 4 by a suitable gear mechanism, for example, a globoid gear.

FIGS. 2 and 3 show in detail the formation of the sprue 11 upon the substrate 10. Reference is made in this context to German Pat. No. DE 35 26 632 C2. The short section 21 has an undercut 25 which is shaped in a suitable undercut in the center section 15 of the moving half-mold 4 and terminates in a flat portion 26 that is oriented essentially parallel to the substrate plane and connected with an elongated part 27 formed in the sprue channel 8. The flat portion 26 projects slightly into the opening 28 of the substrate 10, with a slightly larger sprue portion 29 projecting out in relation to the substrate 10. A small connection zone 30, which later forms the separation edge for separating the sprue, is located between the substrate 10 and the sprue 11, in particular between the substrate 10 and the center portion 26 of the sprue 11.

FIG. 4 shows clearly the pass-fit between the substrate 10 with the sprue 11 and the substrate retaining member 23 after demolding from the moving half-mold 4. The larger sprue portion 29 has a bevel 31 to ensure a precise and secure centered disposition of the substrate and the sprue 11 in the substrate retaining member 23. The sprue portion 29 has a cylindrical region 32 positioned adjacent to the bevel 31 and defined by a diameter which is smaller by several hundredths of a millimeter (typically by between 0.02 mm and 0.05 mm) than an inside diameter of the substrate retaining member 23 in this region. The substrate retaining member 23 includes a portion 33 that defines a flat support surface 34 with the substrate 10 and is formed with a vacuum channel 35 for connection of a vacuum pump (not shown). The sprue 11 holds the substrate 10 in movement direction of the lever 24, while the vacuum in the vacuum channel 35 holds the substrate 10 perpendicular to the movement direction. The vacuum channel 35 can be implemented as an annular channel, as depicted in FIG. 4, that can be connected to a central vacuum channel (not shown). Alternatively, several vacuum channels terminating in the support surface 34 can extend parallel to the longitudinal axis of the substrate retaining member 23.

The fabrication of a substrate for optical data carriers will now be described in detail with reference to FIGS. 5 to 8. The lever 24 pivots outwards from the injection mold until the substrate retaining member 23 is positioned between a sprue ejector 36 and a sprue removal unit 39. The sprue ejector 36 is secured to the moving platen 3 and conjointly moved therewith. The sprue removal unit 39 is attached to the fixed platen 1.

Figure 7:
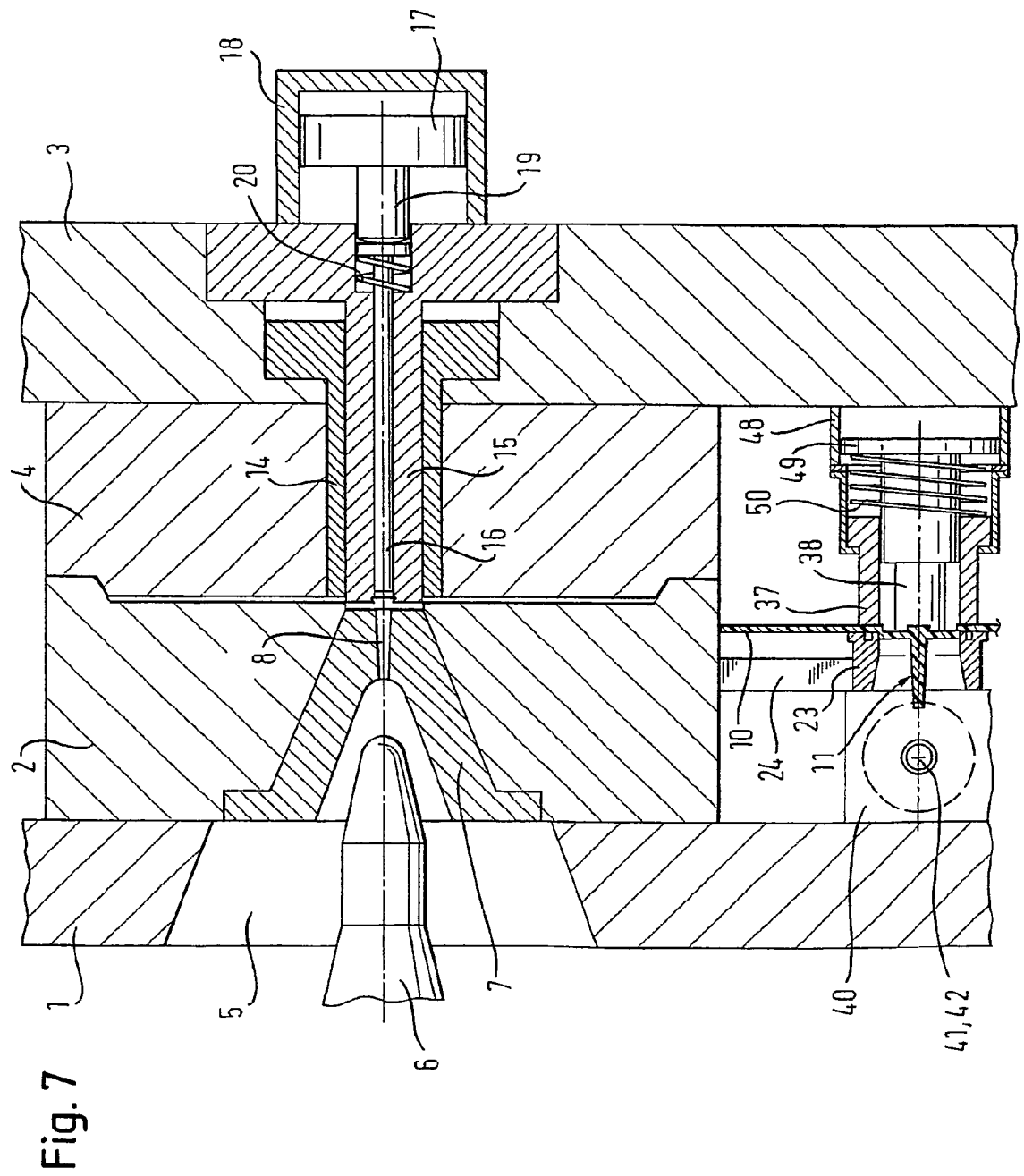
FIG. 7 is a schematic sectional view an injection mold with sprue removal unit, with the injection mold in closed position.

Referring now to FIG. 7, when the injection mold is closed to perform an injection molding operation, the sprue ejector 36 and the sprue removal unit 39 face each other at a distance to still enable the lever 24 with the substrate retaining member 23 and the attached substrate 10 (and the sprue 11 connected therewith) from the previous injection molding cycle to fit between the sprue ejector 36 and the sprue removal unit 39. The sprue ejector 36 has a hold-down element 37 and an axially movable knock-out die 38 that operates on the substrate 10. For example, pressure can be applied in a known manner to a piston 49 that is movable in a cylinder 48 to urge the knock-out die 38 forward towards the sprue 11. For example, a return spring 50 can return the knock-out die 38 to its initial position. The operating mechanism for the hold-down element 37 can be constructed in a similar manner. The region of the sprue removal unit 39 facing the substrate retaining member 23 forms a resistance member 40 that prevents bending of the lever 24 when the sprue 11 is knocked out. When the sprue removal unit 39 is moved towards the resistance member 40, the hold-down element 37 is first brought into contact with the substrate 10. The knock-out die 38 then moves forward to push or knock the sprue 11 out of the substrate 10. Stress in the substrate 10 is virtually eliminated since the substrate 10 is firmly held down during the separation of the sprue 11. An air nozzle 41 connected to a compressed air source (not shown) is provided in the resistance member 40, generating an air flow, indicated by the arrows, and concurrently a Venturi effect in the sprue removal channel 42. The air flow draws the sprue 11 and any dust produced by the breaking process into the sprue removal channel 42.

Figure 6:
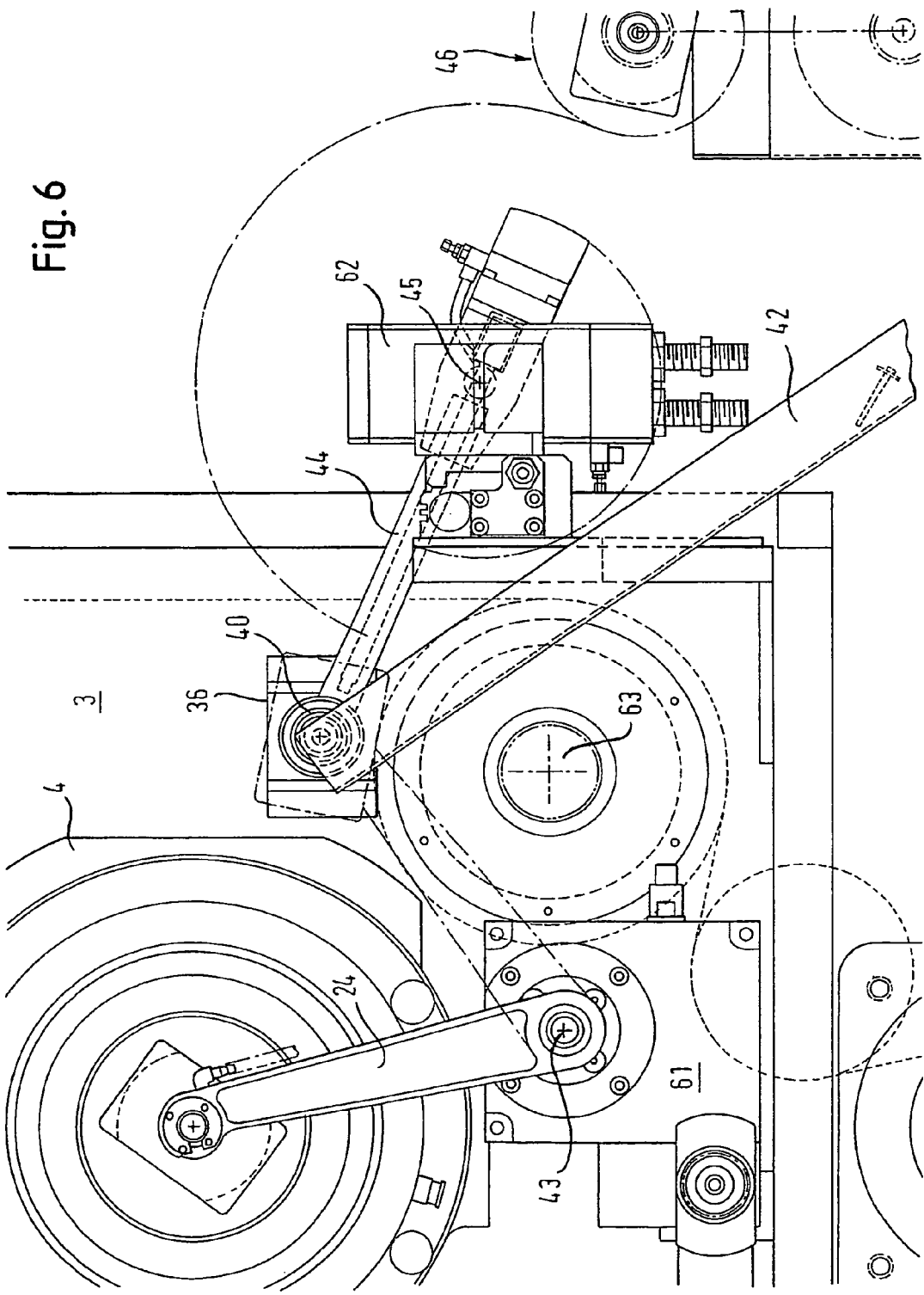
FIG. 6 is a detailed view of a lever/gripper mechanism fore sprue removal.
Figure 8:
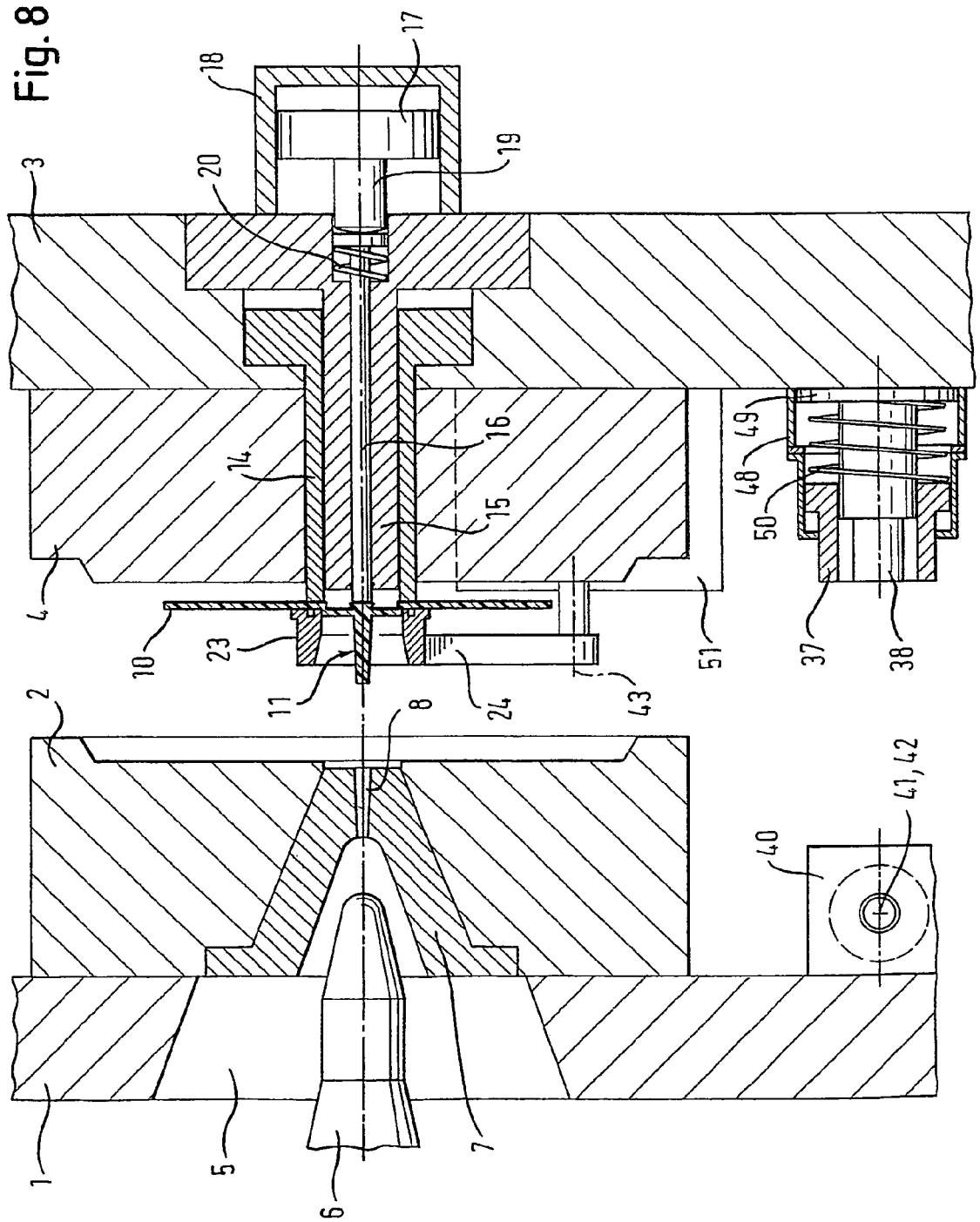
FIG. 8 is a schematic sectional view of the injection mold of FIG. 7, with the injection mold in open position.

FIG. 6 shows in more detail a pivoting mechanism 61 to swing the lever 24 with the substrate retaining member 23 back and forth about the pivot axis 43 (extending perpendicular to the drawing plane) between a first position between the half-molds 2, 4 and a second position between the sprue ejector 36 and the resistance member 40. After the sprue 11 has been separated from the substrate 10, it is removed from the injection mold through the sprue removal channel 42. The half-molds 2, 4 are then opened again, as shown in FIG. 8, allowing the lever 24 to swing back between the open half-molds 2, 4. Simultaneously, the finished substrate 10 can be picked up at the location of the sprue ejector 36 by a gripper arm 44 which can rotate about a rotation axis 45, oriented perpendicular to the drawing plane, as shown in FIG. 6. The gripper arm 44 can then transfer the substrate 10 to a following processing station 46, as also shown in FIG. 6.

Figure 9:
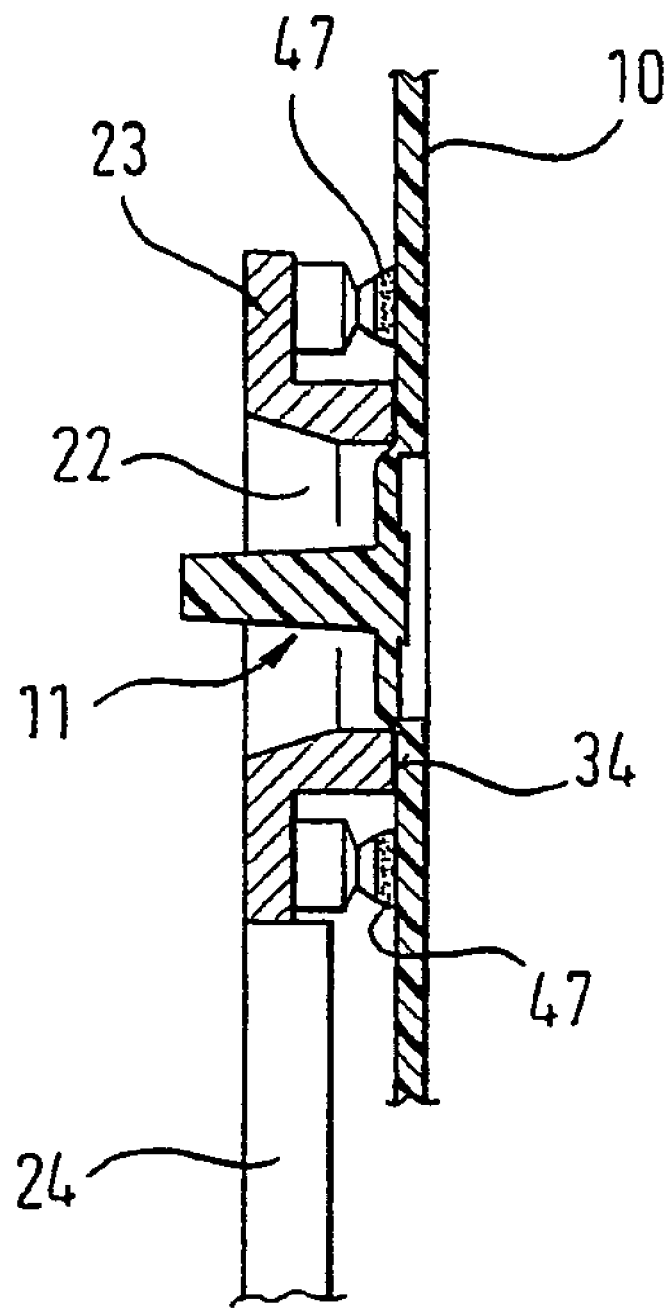
FIG. 9 is a sectional view of another embodiment of a substrate retaining member.

FIG. 9 shows an alternative embodiment of the substrate retaining member 23. Parts corresponding with those in FIG. 4 are denoted by identical reference numerals and not explained again. The description below will center on the differences between the embodiments. In this embodiment, provision is made for suction cups 47 located outside the support surface 34, instead of the vacuum channels 35 in the support surface 34. This embodiment also allows a rapid pivoting motion, because the sprue 11 fits exactly in the opening 22 of the substrate retaining member 23. However, the suction cups 47 can leave imprints on the substrate, so that this embodiment is limited to applications where only the information-carrying area of an optical data carrier is metallized.

FIG. 10 shows another embodiment of a demolding and sprue removal device according to the present invention, by which the sprue 11 is first separated in the mold, before the substrate 10 is transferred to the pivot arm 24. Parts corresponding with those in FIG. 1 are denoted by identical reference numerals and not explained again. The description below will center on the differences between the embodiments. A sleeve 51 has an undercut 52, with the sprue 11 being molded in the undercut 52. After the molding process of the substrate 10 is completed, the sprue 11 is separated from the substrate 10 by hydraulically moving the sleeve 51 rearward. Since the sprue 11 is formed in the undercut 52, it is also pulled rearward and separated from the substrate 10. When the sleeve 51 assumes the rearward position, as shown in FIG. 10, an ejector pin 53 is actuated to expel the sprue 11 from the undercut 52 so that the sprue 11 can drop into a sprue removal channel 42, in which air can be injected through an air nozzle 41 to generate a Venturi effect. The finished substrate 10 can be removed by pivoting the lever 24 into the region between the half-molds 2 and 4, in a similar manner to that described above with reference to FIGS. 6–8. A substrate retaining member 54 is attached to the end of the lever 24. The substrate retaining member 54 has a cylindrical projection in form of a peg 56 which faces the substrate 10 and fits in the opening 55 created in the substrate 10. The substrate 10 is removed from the moving half-mold 4 by actuating the knock-out sleeve 14 which then pushes the substrate 10 onto the peg 56. The peg 56 is sized to exactly fit in the opening 55. Preferably, the diameter of the peg 56 is smaller by several hundredths of a millimeter, preferably by between 0.01 mm and 0.05 mm, than the diameter of the opening 55 in the substrate 10. In this way, the substrate 10 is fixed in the movement direction of the lever 24, and the lever 24 (or pivot arm) can pivot rapidly without detachment or shifting of the substrate 10. A shoulder 57 with a support surface 34 for the substrate 10 is formed around the peg 56 to secure the substrate 10 in the closing direction. The shoulder 57 can also have a vacuum channel 35, as described above with reference to FIG. 4.

FIG. 11A shows in an enlarged scale the construction of the pivot arm 24 or lever 24 with the substrate retaining member 54, the peg 56 and the vacuum channel 35. FIGS. 11B and 11C show variations for securing the substrate 10 on the retaining member 54, namely by using suction cups 47 (FIG. 11B) arranged about the peg 56, or with a ball catch 58 (FIG. 11C). FIG. 11D shows an enlarged detail of the ball catch 58, showing several balls 59 (only one of the balls is shown) which are urged outwardly by spring elements 60. When the substrate 10 is pushed on the peg 56, the balls 59 all urged inwardly by the substrate 10, as indicated in FIG. 10D by an arrow. After the substrate 10 has been pushed onto the peg 56 beyond the range of the balls 59, the balls 59 are urged radially outwardly by the spring elements 60, thereby securing the substrate 10 on the peg 56.

A substrate retaining member similar or identical to the aforedescribed substrate retaining member 23 with the recess or opening 22 can also be provided on the gripper arm 44 of the following handling unit (see FIG. 6). In this case, the substrate 10 with the connected sprue 11 are first demolded from the injection mold by a first handling unit and inserted into the substrate retaining member 23 on the gripper arm 44. The gripper arm 44 with the substrate retaining member 23 and the substrate 10 with the sprue 11 are then pivoted into a sprue separation device, as described above with reference to the FIGS. 5 to 8. The sprue ejector 36 and the sprue removal unit 39 can here also be attached to the moving platen and the fixed platen, respectively, as shown in FIGS. 7 and 8.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A device for removing an injection-molded substrate with attached sprue from an injection mold having half-molds, comprising:
    a lever swingable in a movement direction in and out of a position between the half-molds of the injection mold; and
    a substrate retaining member to hold the substrate, said substrate retaining member having a receptacle which is contoured to mate with the sprue sufficient to secure the substrate with the sprue in place as the lever swings in movement direction.

2. The device of claim 1, wherein the receptacle is a recess in the substrate retaining member.

3. The device of claim 1, wherein the receptacle is an opening in the substrate retaining member.

4. The device of claim 1, wherein the substrate retaining member has a planar support surface in a region of the receptacle for supporting the substrate.

5. The device of claim 1, wherein the substrate retaining member receives the substrate for an optical data carrier, with the substrate having the sprue formed in an area of an opening to be subsequently formed in the substrate, said sprue having a sprue portion that projects from the substrate, wherein the receptacle of the substrate retaining member has a diameter which conforms to a diameter of the projecting sprue portion.

6. The device of claim 5, wherein the diameter of the receptacle in the substrate retaining member is greater by less than 0.05 mm than the diameter of the projecting sprue portion.

7. The device of claim 5, wherein the diameter of the receptacle in the substrate retaining member is greater by less than 0.03 mm than a diameter of the projecting sprue portion.

8. The device of claim 4, wherein the support surface includes at least one vacuum channel for connection of a vacuum pump to thereby draw the substrate against the support surface in a direction perpendicular to the movement direction.

9. The device of claim 4, wherein the support surface has an outside diameter sized without extending beyond a clamping area.

10. The device of claim 1, and further comprising a sleeve movable in a mold closing direction and disposed in one of the half-molds that carries the substrate for transferring the substrate to the substrate retaining member, said sleeve constructed to push the substrate with the sprue into the receptacle of the substrate retaining member.

11. A device for removing an injection-molded substrate with attached sprue from an injection mold having half-molds, comprising:
    a lever swingable in and out of a position between the half molds of the injection mold and constructed to include a substrate retaining mechanism; and
    a peg constructed to hold the substrate and insertable in a receptacle produced in the substrate when the sprue is separated.

12. The device of claim 11, wherein the receptacle is a recess in the substrate.

13. The device of claim 11, wherein the receptacle is an opening in the substrate.

14. The device of claim 11, wherein the peg has one end plunging in the substrate and configured to have a tapered region.

15. The device of claim 14, wherein the peg includes spring-biased balls which are pushed out of the peg behind the substrate, after the peg has plunged through the receptacle of the substrate.

16. The device of claim 11, wherein the peg includes at least one vacuum channel for connection of a vacuum pump.

17. The device of claim 11, wherein the peg includes a shoulder for abutment by the substrate.

18. The device of claim 17, wherein the shoulder has a surface upon which the substrate bears and includes at least one vacuum channel terminating in the surface.

19. The device of claim 11, and further comprising a sleeve movable in a mold closing direction and disposed in a substrate-carrying one of the half-molds for transferring the substrate to the peg, said sleeve constructed to push the substrate towards the peg.

20. An injection molding machine for producing a substrate with attached sprue, comprising:
    an injection mold having half-molds that form a mold cavity for the substrate and have a sprue channel for introducing plastic melt into the mold cavity;
    an extraction device for removing the substrate with the sprue, said extraction device including a lever swingable in and out of a position between the half-molds of the injection mold and constructed to include a substrate retaining mechanism, said substrate retaining mechanism including a substrate retaining member having a receptacle sized to hold the substrate and configured to receive the sprue with a pass fit so that the substrate retaining member secures the substrate in place as the lever swings in and out;
    a sprue ejector for separating the sprue, said sprue ejector placed outside the injection mold and having an axially movable die, wherein the substrate retaining member is adapted to be aligned with the die, after the lever swings out of the half-molds; and
    a resistance member placed on a side of the substrate retaining member facing away from the die, so that the substrate retaining member is urged against the resistance member when the sprue us expelled.

21. The injection molding machine of claim 20, wherein the sprue ejector includes a spring-loaded clamp in surrounding relationship to the die, said clamp adapted to be pressed against the substrate during separation of the sprue, before the die contacts the sprue.

22. The injection molding machine of claim 20, wherein the resistance member is constructed as a sprue removal unit having at least one air nozzle for generating a Venturi effect.

23. The injection molding machine of claim 20, wherein the sprue ejector is secured to the moving half-mold or the moving platen so that the sprue ejector is located directly in front of the substrate, when the mold is closed, allowing the sprue to be pushed out.

24. The injection molding machine of claim 20, wherein the resistance member is secured to the fixed half-mold or the fixed platen so that the substrate is located between the sprue ejector and the resistance member when the mold is closed.

25. The injection molding machine of claim 20, wherein the extraction device includes a standard handling unit with a gripper arm, and wherein a following handling unit comprises a gripper arm also having the substrate retaining means.

* * * * *